Figure 1:
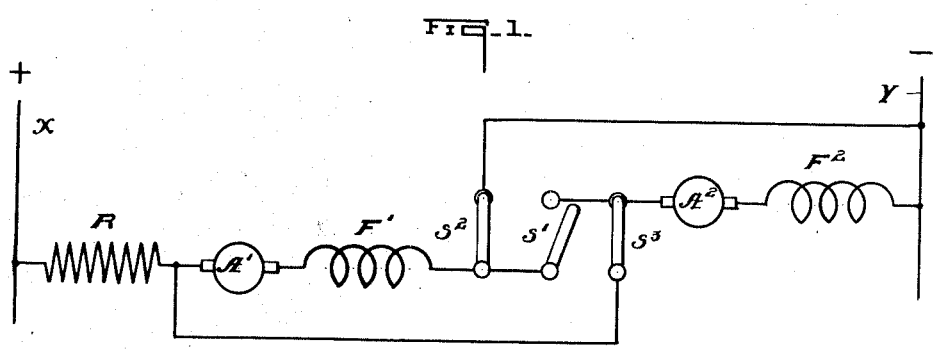

No. 875,901. PATENTED JAN. 7, 1908.
A. C. EASTWOOD.
SYSTEM OF CONTROL FOR ELECTRIC MOTORS.
APPLICATION FILED MAY 22, 1906.

3 SHEETS—SHEET 1.

WITNESSES:
INVENTOR
A. C. Eastwood,
by Pierce Barber
ATTORNEYS

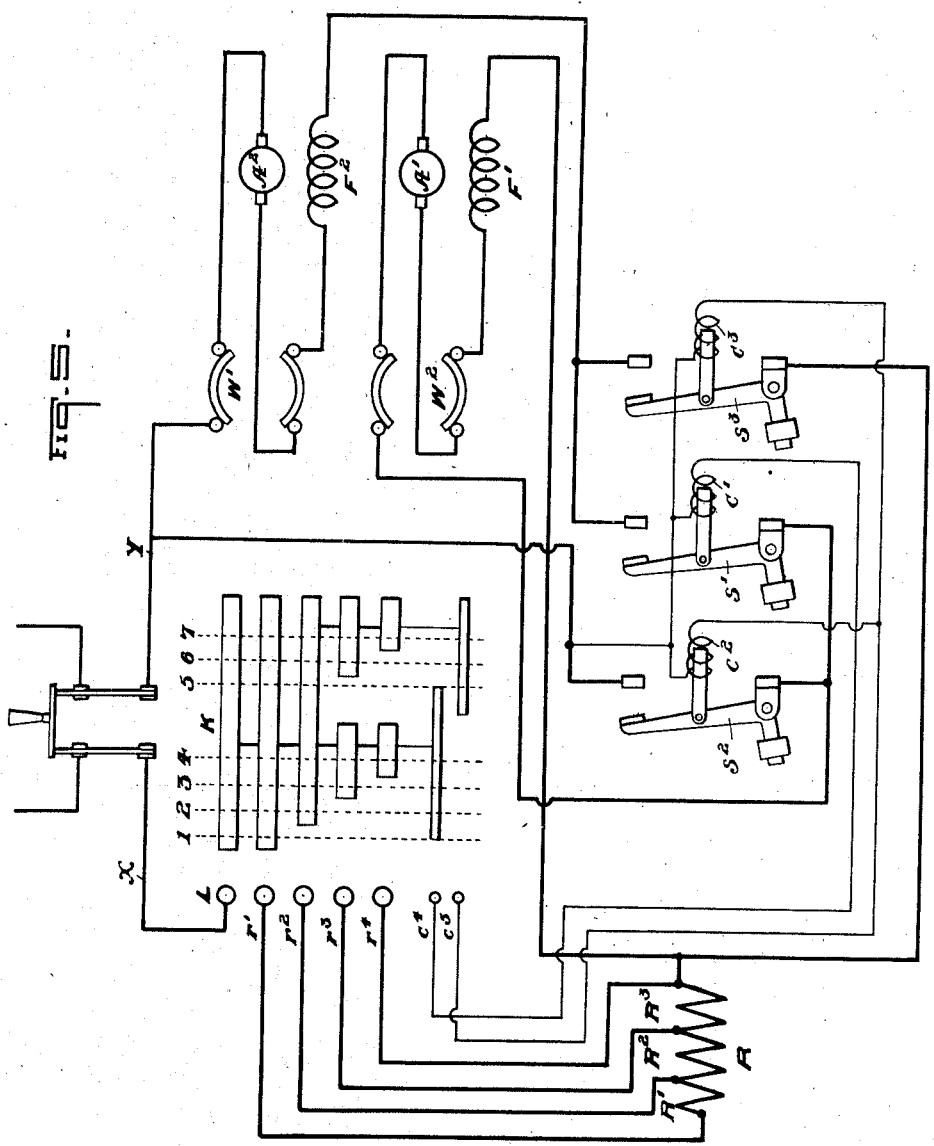

No. 875,901. PATENTED JAN. 7, 1908.
A. C. EASTWOOD.
SYSTEM OF CONTROL FOR ELECTRIC MOTORS.
APPLICATION FILED MAY 22, 1906.
3 SHEETS—SHEET 3.
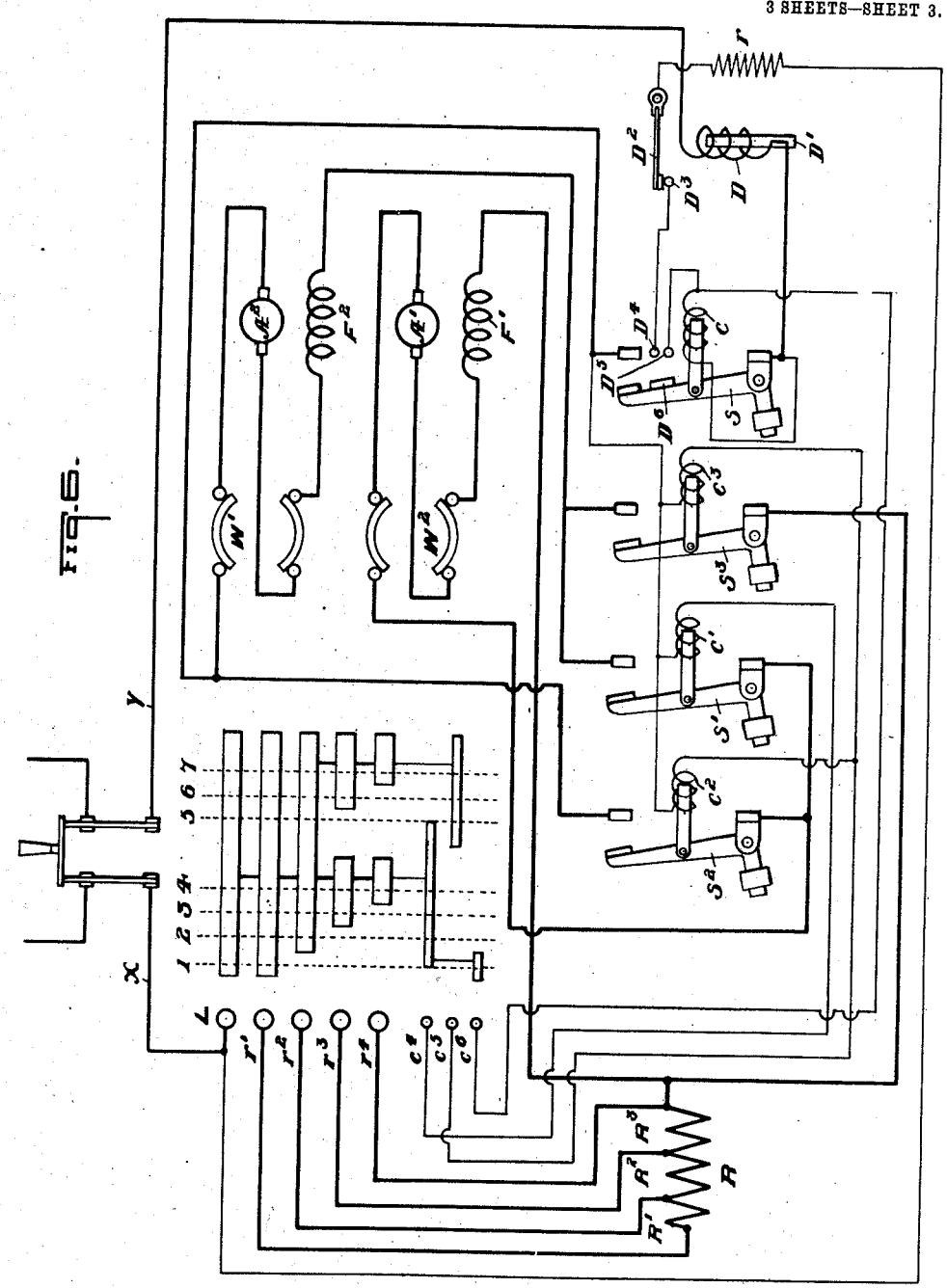
WITNESSES:
INVENTOR
A. C. Eastwood,
by Pierce Barber,
ATTORNEYS.

UNITED STATES PATENT OFFICE.

ARTHUR C. EASTWOOD, OF CLEVELAND, OHIO.

SYSTEM OF CONTROL FOR ELECTRIC MOTORS.

No. 875,901.  Specification of Letters Patent.  Patented Jan. 7, 1908.

Application filed May 22, 1906. Serial No. 318,214.

*To all whom it may concern:*

Be it known that I, ARTHUR C. EASTWOOD, a citizen of the United States, residing at Cleveland, in the county of Cuyahoga and State of Ohio, have invented or discovered new and useful Improvements in Systems of Control for Electric Motors, of which the following is a specification.

My invention relates to a new and useful combination of devices which is particularly applicable to the control of motors driving electric railway cars or trains or other uses, in which two or more electric motors may be applied to driving the same load.

My invention deals particularly with means for altering the circuit connections of the motors with respect to one another and with respect to the supply mains in order to control the speed and power of the motors.

The objects of my invention are: 1st: to change the circuit relations of the motors in such a manner that none of them will be forced to carry an undue share of the load while the circuit changes are being made. 2nd: to effect the circuit changes in such a manner that each of the motors will at all times be symmetrically connected with respect to the other motor or motors with which it coöperates. 3rd: to effect the circuit changes with extreme rapidity. 4th: to effect the circuit changes at a speed which is independent of the speed at which the operator moves the controlling switch. 5th: to secure smooth acceleration, avoiding excessive flow of current and a corresponding jerk of the car at the time of changing the circuit relations of the motors. 6th: to protect in a reliable manner the motors from undue overload. 7th: to open automatically the circuit of the motors upon failure of voltage, thereby preventing burning of the trolley wheel and wire in case the wheel should be brought into contact with the wire before the operating controller is returned to the "off-position". 8th: to arrange the controller so that, upon failure of current supply, the operating controller must be returned to the "off-position" before current can again be admitted to the motors, thus insuring restarting the motors in a normal manner. 9th: to produce a controller of the character described which, in general, will not require particular skill or knowledge on the part of the operator to insure its proper operation. I prefer to attain these desired results as shown in the accompanying drawings and as hereinafter described, but I do not limit myself to the details and precise combination so shown and described.

Figure 3:
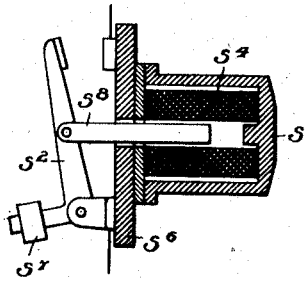
Figure 2:
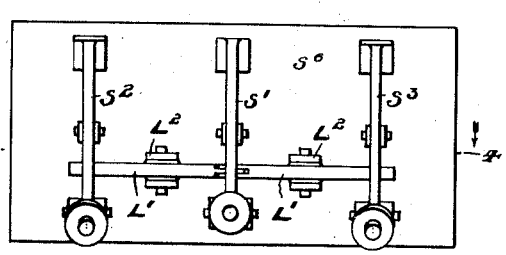

Referring to the drawings, Figure 1 is a simplified diagram of electrical connections used in the practice of my invention for the series parallel control of two motors. Fig. 2 is an elevation and Fig. 4 a section on line 4—4 of Fig. 2, showing a group of power-operated switches, which I may employ for carrying out the alterations in motor connections. Fig. 3 shows, partly in section, one form of power-operated switch which I may employ. Fig. 5 is a diagram of electrical connections of an embodiment of my invention, in which the resistance switch and the motor reversing switch are operated by hand and the motor connections are governed by power-actuated switches. Fig. 6 is a diagram of connections of an arrangement similar to that shown in Fig. 5, with the addition of certain protective devices which will be hereinafter described.

In Fig. 1, X and Y represent the current supply lines, $A^1$ is the armature and $F^1$ the field windings of one motor, while $A^2$ and $F^2$ are the similar elements of a second motor. R is a resistance for limiting the current in starting and at the time of changing the motor connections from series to parallel and may also be used for reducing the running speed of the motors. $S^1$, $S^2$, and $S^3$ are power-operated switches for shifting the motor connections.

In starting the motors the switch $S^1$ is closed, the switches $S^2$ and $S^3$ remaining open. Current then flows from the supply main X, for instance, through the resistance R, the motor $A^1$, thence by switch $S^1$, through the second motor $A^2$ to the supply main Y. The motors are then connected in series and are also in series with the resistance R and should operate at minimum speed. The resistance R may then be short-circuited or cut out by a resistance switch such as that indicated in Fig. 5, leaving the motors connected in series and therefore operating at approximately one-half maximum speed. Switch $S^1$ is then opened and switches $S^2$ and $S^3$ are closed, a portion of the resistance R being preferably at the same time reinserted in the circuit. Current can then flow from the supply main X through the resistance R, the motor $A^1$ and thence by switch $S^2$ to the supply main Y. Current may also flow from the supply main X through the resistance R thence by the path which is provided for it to the switch $S^3$ and thence through the second motor $A^2$ to the supply main Y. The motors $A^1$ and $A^2$ are then connected in parallel or multiple. When the resistance R is short-circuited or cut out each of them should operate at full speed.

Figure 4:
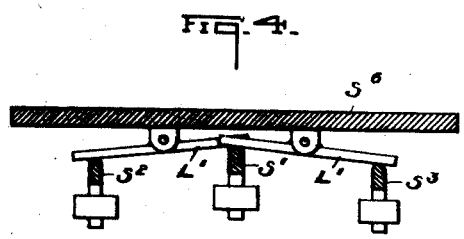

The arrangement and operation of switches $S^1$, $S^2$, and $S^3$ is more clearly shown in Figs. 2, 3, and 4. In Fig. 2, the switches $S^1$, $S^2$, and $S^3$ are shown in front elevation. One of the switches is shown partly in section in Fig. 3 in which $S^2$ is the switch pivoted at its lower end in a suitable bearing which forms one terminal of the switch, and carrying a contact piece at its upper end which coöperates with a stationary contact mounted toward the top of the insulating slab $S^6$, which carries the various parts of the switch mechanism. The switch is normally held open by a weight $S^7$, and is closed by energizing the electro-magnet $S^4$, of which the plunger $S^8$ is connected to the arm of the switch $S^2$. The steel or iron casting $S^5$ forms the return magnetic circuit of the magnet $S^4$. Locking bars $L^1$ are pivoted in suitable bearings $L^2$ midway between the arms of switches $S^2$ and $S^1$, and $S^1$ and $S^3$, the bars extending behind the arms of the switches as shown in Figs. 2 and 4. It will be readily understood that the locking bars mechanically prevent switches $S^2$ and $S^3$ from closing when switch $S^1$ is closed and similarly prevent $S^1$ from closing when either $S^2$ or $S^3$ is closed.

In carrying out my invention, as previously stated, switch $S^1$ is closed when the motors are operated in series. The closure of switch $S^1$ is accomplished by energizing the coil of the electro-magnet by the use of an operator's switch. In changing the motor connections from series to parallel, the magnetizing coils of switches $S^2$ and $S^3$ are energized before the circuit of the magnetizing coil of switch $S^1$ is opened. Switches $S^2$ and $S^3$ then tend to close but are held from closing by the locking bars $L^1$. They may then be said to remain tugging at the locking bars and endeavoring to close till the circuit of the magnetizing coil of switch $S^1$ is opened at the contacts of the operator's switch, at which time they instantly close.

I have found by experiment that the period of time elapsing between the opening of switch $S^1$ and the closing of switches $S^2$ and $S^3$ may, by this arrangement, be reduced to one fiftieth of one second, a period of time so short that there is practically no cessation of current flow to the motors. Consequently, the change from series to parallel connection may be accomplished without the customary "jerk" even in hoisting a load, for the supply of current is cut off for such a brief interval that there can be no appreciable slowing down of the load. It will be readily understood that the period of time elapsing between the opening of switch $S^1$ and the closure of switches $S^2$ and $S^3$ depends upon the physical constants of the switches and is independent of the speed at which the operator moves his controlling switch.

Referring now to Fig. 5, K represents an operating switch of the well-known cylinder type, having a row of relatively stationary contact fingers L, $r^1$, $r^2$, $r^3$, $r^4$, $C^4$, and $C^5$, which coöperate with a series of contact strips suitably mounted upon the surface, or, so as to form portions of the surface of a cylinder. By rotation of the strips, the circuits terminating at the contact fingers are connected in the required order. R is a bank of resistance of any suitable form and construction. $W^1$ and $W^2$ are reverse switches for reversing the direction of rotation of the armatures of the motors $A^1$ and $A^2$ in the well-known manner. The switches $W^1$ and $W^2$ are preferably constructed as described in my pending application for United States Patent, Serial No. 312,613. They may be conveniently mounted within the same frame or casing which incloses the switch K but will preferably be operated by means of a separate lever or handle. $S^1$, $S^2$, and $S^3$ are magnetically operated switches such as those illustrated and described in connection with Figs. 2, 3, and 4. $C^1$, $C^2$, and $C^3$ are the magnetizing coils of the electro-magnets which close the switches. One end of each of the windings is connected to the supply main Y. The other end of the winding of the coil $C^1$ is connected to contact finger $C^4$ of the operating switch K and the other ends of the coils $C^2$ and $C^3$ are together connected to the contact finger $C^5$.

The operating switch K is shown in the "off-position" with none of the contact rings or strips in contact with the fingers. The various operating positions of the switch which occur when the cylinder of the switch is rotated so as to bring contact rings under the line of contact fingers, are designated by the dotted lines 1, 2, 3, 4, etc. When the operating switch is turned to the position 1, contact fingers L, $r^1$, and $C^4$ are in contact with the corresponding rings. Current enters the contact rings, which are all electrically connected with one another, from the supply main X, through the contact finger L. Switch $S^1$ then closes, since one end of its magnetizing winding is connected to the supply main Y, while the other end is connected to the second supply main through the contact finger $C^4$, and the corresponding contact ring, which in turn, is connected to the supply main X, through the contact finger L. With switch $S^1$ closed current can then flow from the supply main X, through the contact finger L, thence through the strips on the drum, through contact finger $r^1$, through the resistance R, thence through the field $F^1$ of the first motor, thence by way of two of the contacts of the reversing switch $W^2$, through the armature $A^1$ of the motor, thence through the remaining contacts of the reversing switch $W^2$ to the lower terminal of switch $S^1$, thence through the switch $S^1$, through the field $F^2$ of the second motor, thence through two of the contacts of the reversing switch $W^1$, through the armature $A^2$ and thence by way of the remaining contacts of the reversing switch $W^1$ to the supply main, thus completing the circuit. The two motors $A^1$ and $A^2$ are then in series and in series with the entire resistance R.

When the drum of the controlling switch is turned to the second position, the contact finger $r^2$ comes into contact with the corresponding ring, thus cutting out the first section $R^1$ of the resistance R, the remaining circuit connections continuing as before with the two motors in series. In the third position of the controlling switch, the contact finger $r^3$ is in contact with the corresponding rings and two sections $R^1$ and $R^2$ of the resistance R are cut out. When the fourth position is reached, the contact finger $r^4$ is in contact with the corresponding ring and all of the resistance R is cut out, the two motors being supplied with full voltage and operating in series. When passing from position 4 to position 5, the contact rings pass beyond the fingers $r^3$ and $r^4$, thus inserting the sections $R^2$ and $R^3$ of the resistance R in the motor circuit. It will be seen also that between positions 4 and 5, the contact finger $C^4$ loses contact with the corresponding ring, but before this takes place the contact finger $C^5$ makes contact with its ring so that the coils of switches $S^2$ and $S^3$ are energized before the circuit of the coil of switch $S^1$ is opened. Switches $S^2$ and $S^3$ are then prepared to instantly close when the circuit of the coil of switch $S^1$ is opened, for the reasons hereinbefore given at length.

When position 5 is reached, switch $S^1$ is open and switches $S^2$ and $S^3$ are closed. Current then enters the controlling switch through the contact finger L, passes by way of the contact finger $r^2$, to the second section $R^2$ of the resistance R, then passes through the resistance and divides. One portion of the current passes through the lower terminal of switch $S^3$, thence through this switch, through the field $F^2$ of the second motor and by way of two of the contacts of the reversing switch $W^1$, the armature of the motor $A^2$, the remaining contacts of the reversing switch $W^1$, to the supply main Y. The other portion of the current passes directly to the field $F^1$ of one of the motors, thence through two of the contacts of the reversing switch $W^2$, through the armature of the motor $A^1$, the remaining contacts of the reversing switch $W^2$, thence to the lower terminal of switch $S^2$, and through this switch to the supply main Y. It is therefore seen that the two motors are connected in parallel with a portion of the resistance R in circuit with them. When the controlling switch is moved to position 6, the section $R^2$ of the resistance R is cut out through the contact of finger $r^3$ with the corresponding strip, the motors still remaining in parallel. In position 7, all of the resistance R is cut out and the motors should, therefore, operate at full speed in the parallel relation. When the drum of the controlling switch is rotated in the reverse direction, the same series of circuit changes take place in the inverse order. It is to be noted that in coming to the off-position, the contact finger $C^4$ opens the circuit with the corresponding strip before the contact fingers $r^1$ and L open the circuit with their strips. This causes switch $S^1$ to open before the circuit is opened at the contact fingers L and $r^1$. All of the arcing which occurs in opening the circuit is, therefore, confined to the contacts of switch $S^1$.

Turning now to Fig. 6, the diagram of connections there shown is the same as that shown in Fig. 5 with the addition of a magnetically operated main switch S and overload switch D, with the necessary electrical connections between these parts. The main switch S and the overload switch D serve to protect the motors against excessive overload by opening the main circuit, thus cutting off the supply of current upon the occurrence of an overload. The switch S is also so arranged that it will be opened upon failure of the supply voltage and cannot again be closed until the controlling switch K is returned to the starting position. It will be seen that the main current from both of the motors must pass through the switch S and through the overload coil D, before reaching the supply main Y. One end of the winding of the coil C of switch S is connected to the supply main Y at the lower terminal of the switch S. The other end of the winding is provided with two connections, one of them to the contact finger $C^6$ at the operating switch, which coöperates with a short contact ring and when in contact therewith connects the second end of the winding C to the supply main X through the drum of the controller and the contact finger L. The second connection is to a contact $D^5$ of an auxiliary switch which is closed when the switch S is closed. The blade $D^6$ of this auxiliary switch connects the contact $D^5$ to the contact $D^4$, which in turn connect through the switch contacts $D^3$ and $D^2$ and the resistance $r$ to the supply main X. When the controller K is in position 1, the coil of switch S would be excited since one end of its winding is connected to the supply main Y and the other end is connected through the contact finger $C^6$ and the controller to the supply main X. The switch S will, therefore, close and in closing the switch blade $D^6$ will span the stationary contacts $D^4$ and $D^5$. Current can then flow from supply main X, through the resistance $r$, switch contacts $D^2$ and $D^3$, the auxiliary switch contacts $D^4$, $D^5$, and $D^6$ to the coil C, and thence through said coil to the supply main Y. The resistance $r$ is so proportioned as to allow sufficient current to flow to maintain the switch S in the closed position. When the controller K is in position 1, the coil of switch S is connected directly between supply mains X and Y and therefore receives full current and closes the switch. When the contact finger $C^6$ leaves contact with the corresponding ring, the switch S is closed, but its coil is excited at a reduced voltage on account of the resistance $r$ which is in circuit with the coil. This economizes the use of current and at the same time prevents excessive heating of the coil C.

D is an overload coil which forms the magnetizing winding of an electro-magnet having a plunger $D^1$. This plunger may be weighted or held down by a spring in such a way as to be drawn up into the magnetizing coil upon the flow of a predetermined current through the coil. When the plunger $D^1$ is thus drawn up, it strikes the switch blade $D^2$, raising this blade from contact with the terminal $D^3$, thus opening the circuit of the coil C and causing switch S to open. It will be seen that one end of the coils $C^1$, $C^2$, and $C^3$ of switches $S^1$, $S^2$, and $S^3$ are connected to the upper contact of switch S; so that when the switch S opens, the circuits of all of the coils $C^1$, $C^2$, and $C^3$ are opened; consequently, switches $S^1$, $S^2$ and $S^3$ immediately open. It will be further understood that the switch S cannot again be closed until the controller K is returned to the first or starting position, in which the contact finger $C^6$ is in contact with the corresponding ring, at which point the circuit of the coil C is again closed, this in turn causing the closure of the switch S. Furthermore, since switch S is held in the closed position by an electro-magnet excited from the supply mains, in case the voltage of supply should fail, through the trolley leaving the wire, or other causes, the coil C will be deënergized and the switch S will open as will also switches $S^1$, $S^2$, and $S^3$ and the switch S cannot again be closed until the controller K is returned to the starting position. This prevents current being admitted to the motors in any but the proper manner.

With controllers as at present arranged, it frequently happens that the trolley wheel will leave the wire without attracting the attention of the motorman and that the conductor may attempt to replace the wheel on the wire before the motorman has returned his controller to the off-position. In this case both the trolley wheel and the wire are likely to be seriously damaged through arcing and the motors and gearing are subjected to severe strains owing to the fact that the windings of the motor may form practically a short circuit if the controller is in the full speed position. With my invention it will be seen that this cannot occur since the main circuit is automatically opened in case the trolley leaves the wire and even when the trolley is replaced the circuit through the motors is not reëstablished until the controller is returned to the starting position. My invention, therefore, protects the apparatus on the car against the results of overload and failure of the voltage; and further than this, to reëstablish the circuit after such failure of circuit or overload, all that the motorman or operator is required to do is to return the controlling switch to the starting position. My invention, therefore, protects the motors and controllers against ignorance or carelessness on the part of the operator.

I claim as my invention—

1. In a controller for electric motors, the combination of switches for controlling the speed of the motor, electro-magnetic devices for closing said switches, and means for energizing the closing mechanism of a switch giving a higher motor speed prior to deënergizing the closing mechanism of a switch giving a lower motor speed, and means for causing the closure of each of said switches to depend upon the opening of another of said switches.

2. In a controller for electric motors, the combination of power-actuated switches for controlling the speed of a motor, electro-magnetic devices for closing said switches, means for energizing the closing mechanism of a switch giving a higher motor speed prior to deënergizing the closing mechanism of a switch giving a lower motor speed, and means for preventing the switch giving the higher speed from closing while the switch giving the lower speed is closed.

3. In a controller for electric motors, the combination of power-operated switches for altering the grouping of the motor windings and a master switch for controlling said power-operated switches, said master switch being arranged to energize the operating mechanism of the switch or switches controlling a succeeding grouping of motor windings prior to deënergizing the operating mechanism of a switch or switches controlling a preceding grouping of motor windings.

4. In a series-parallel controller, the combination of motor windings, a power-operated switching means for connecting motor windings in series, a second power-operated switching means for connecting motor windings in parallel, and means for energizing the closing mechanism of said second switching means before deënergizing the closing mechanism of said first switching means.

5. In a series-parallel controller, the combination of motor windings, a power-operated switching means for connecting motor windings in series, a second power-operated switching means for connecting motor windings in parallel, means for energizing the closing mechanism of said second switching means prior to deënergizing the closing mechanism of said first switching means, and means for preventing said second switching means from closing while said first switching means is closed.

6. In a series-parallel controller, the combination of motor windings, a series switching means for connecting motor windings in series, a parallel switching means for connecting motor windings in parallel, means tending to close said parallel switching means prior to the opening of said series switching means, and means for preventing said parallel switching means from closing while said series switching means is closed.

7. In an electric controller, the combination of motor windings, a switching means for connecting motor windings in series, a second switching means for connecting motor windings in parallel directly from their series condition, and positive means for causing said second switching means to close concurrently with the opening of said first switching means.

8. In an electric controller for the control of a plurality of motors, a switching means for connecting the windings of said motors in series, a switching means for connecting the windings of said motors in parallel, means for normally opening said switching means, and means for increasing the force applied to opening either switching means concurrently with the closure of the other switching means.

9. In a controller for electric motors, the combination of an operating-switch, power-operated switches for altering the connections of the motor windings, means for deënergizing the closing mechanism of said power-operated switches upon the occurrence of an overload, and means for preventing the closure of said switches until the operating switch has been turned to the starting position.

10. In a controller for electric motors, the combination of an operating switch, power-operated switches for altering the connections of the motor windings, means for deënergizing the closing mechanism of said power-operated switches upon the failure of current supply, and means preventing the energizing of the closing mechanism of said power-operated switches till the operating switch is turned to the starting position.

Signed at Cleveland, this 11" day of May, A. D., 1906.

ARTHUR C. EASTWOOD.

Witnesses:
J. E. WELLMAN,
C. W. COMSTOCK.